United States Patent

[11] 3,537,551

| [72] | Inventor | Lawrence John Serra<br>1536 E. Cold Spring Lane, Baltimore, Maryland 21218 |
|---|---|---|
| [21] | Appl. No. | 677,537 |
| [22] | Filed | Oct. 24, 1967 |
| [45] | Patented | Nov. 3, 1970 |

[54] SEQUENTIAL BRAKE OR CLUTCH DEVICES
12 Claims, 6 Drawing Figs.

[52] U.S. Cl. .................................................... 188/158,
188/264, 318/372
[51] Int. Cl. .................................................... B60l 7/00
[50] Field of Search............................................ 318/269,
372, 102, 337; 192/49.9, 49.91, 12.2, 18.2;
188/79, 161, 264

[56] References Cited
UNITED STATES PATENTS

| 1,903,550 | 4/1933 | Mechling...................... | 318/372 |
| 2,676,673 | 4/1954 | Bouton.......................... | 318/269 |
| 2,866,529 | 12/1958 | Sprettzer...................... | 192/48.91 |
| 2,913,930 | 11/1959 | Hellyer......................... | 192/48.9 |
| 3,240,302 | 3/1966 | Van Tuyl....................... | 192/18.2 |
| 3,300,004 | 1/1967 | Peterson....................... | 192/48.7 |
| 3,379,292 | 4/1968 | Grygera........................ | 192/18.2 |

Primary Examiner—Oris L. Rader
Assistant Examiner—K. L. Crosson
Attorney—Hill, Sherman, Meroni, Gross and Simpson ABSTRACT: A sequential speed changing system including a rotor driven by a motor, a plurality of speed control units mounted to control the speed of the rotor, a sequential control box, a power supply for the electrically actuated speed control units to supply electric power through the sequential control box such that the speed control units are operated individually to operate within the heat tolerances allowed by manufacture for each of the units.

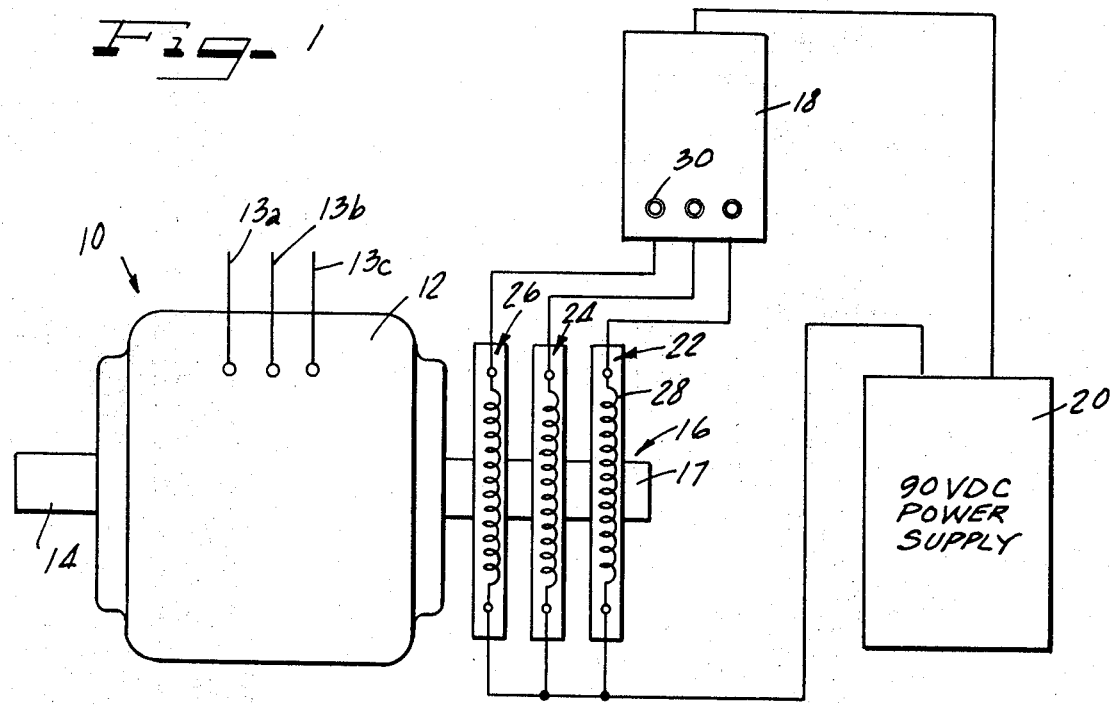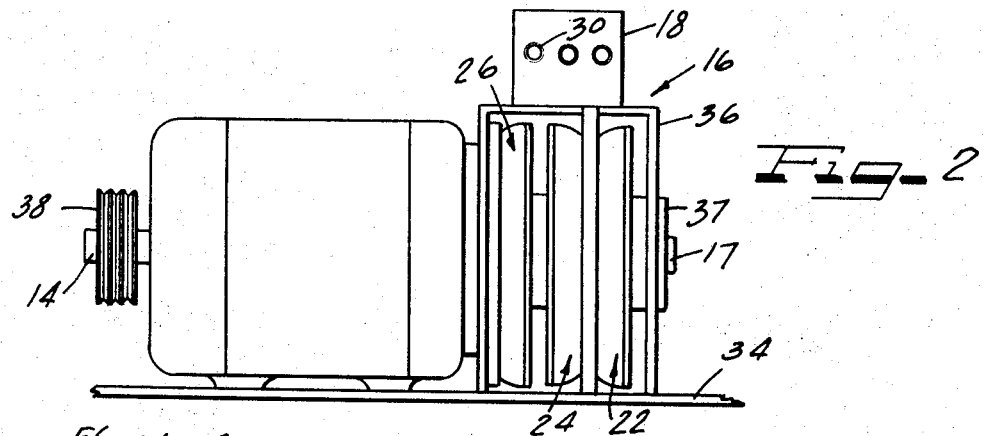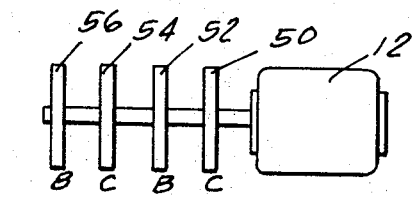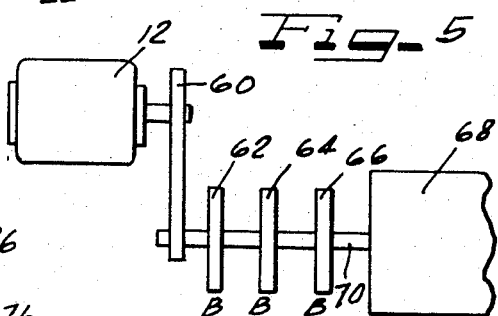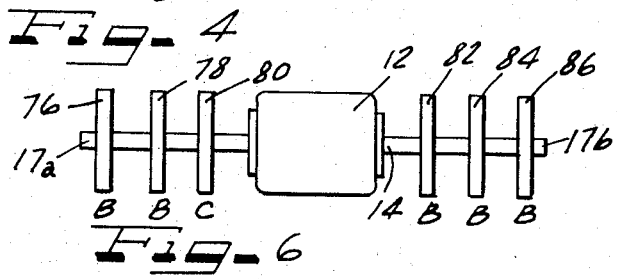
INVENTOR.
LAWRENCE J. SERRA
ATTORNEYS

SEQUENTIAL BRAKE OR CLUTCH DEVICES

FIELD OF THE INVENTION

This invention pertains to a speed changing device, and more particularly to an electric sequential speed changing device having a plurality of control units.

PRIOR ART

It is known to use a brake and a clutch in association with a motor to control the operating cycles of a machine driven by the motor. The brake and clutch are subject to heat generated by rapid cycling of the unit as the drive motor is stopped and started to perform a sequence of speeds as particular functions are performed on a material being processed by the machine.

Overheated brakes and clutches have little or no holding power. Brakes or clutches previously used which are large enough to dissipate the heat of rapid cycling under heavy loads have been found to be too cumbersome and heavy to be practicable. The prior art solution to this problem has involved the addition of cooling units to allow the speed control unit comprising a brake and/or a clutch to perform the rapid sequence of operations called for by the machine.

SUMMARY

In accordance with the present invention, I have provided a sequence control system for a plurality of brakes and clutches associated with a driving motor to control a sequence of operations on a machine.

Accordingly, it is an object of the present invention to provide a sequence control system which allows rapid cycling of a driven machine without overheating the speed control units. Another object of the present invention is to provide a sequence control system for a machine which eliminates the need for separate cooling units.

Still a further object of the present invention is to provide a sequence control device for a machine which overcomes the need for costly and cumbersome brakes or clutches.

Yet another object of this invention is to provide a sequence control device which utilizes a plurality of brakes and clutches mounted on a common shaft in individual sequence such that the individual units are maintained within their manufacturers' heat tolerance.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is a partial schematic and block diagram view of a control system in accordance with the invention;

FIG. 2 is a plan view of a motor and a plural brake assembly in accordance with the invention;

FIGS. 4, 5 and 6 are diagrammatic views of clutches and brakes associated with a motor in various positions.

AS SHOWN ON THE DRAWINGS

Figure 3:
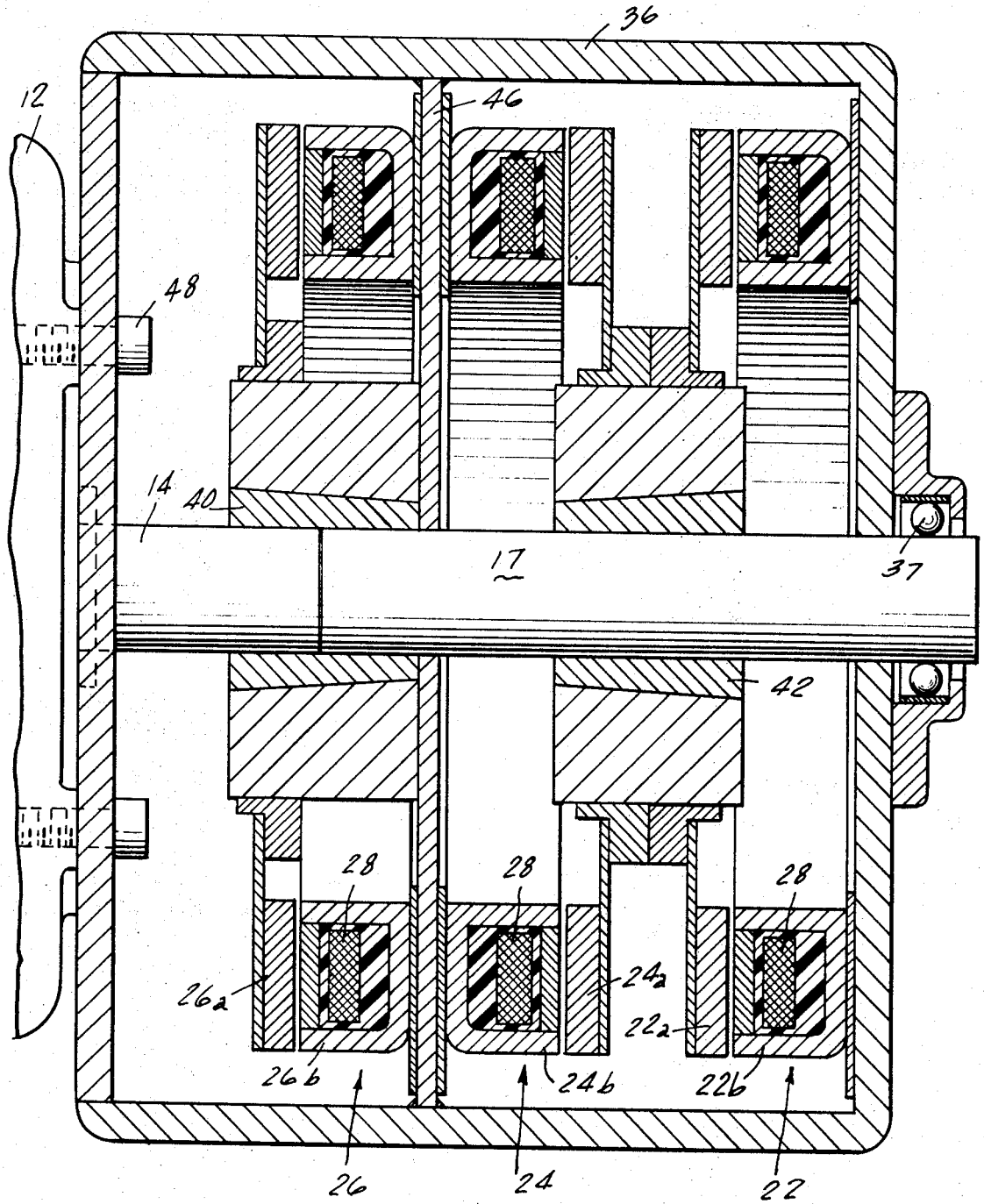
FIG. 3 is a fragmentary enlarged cross-sectional view of the plural brake assembly of FIG. 2.

The principles of this invention are particularly useful when embodied in a sequential brake and clutch control system as illustrated in FIG. 1, generally indicated by the numeral 10.

The control system 10 includes a motor 12 which in this embodiment is shown as being a three phase electric type supplied by a three phase electric supply source over at lines 13a, 13b and 13c. A rotor 14 is driven by the motor 12 and has a sequential speed changing device 16 at one side mounted about an extension 17 of the rotor 14. The sequential speed changing device 16 is actuated by a sequential control box 18 which is a switching device for a 90 volt d.c. power supply 20. The sequential control box 18 selects individual ones of the electric speed changing units 22, 24 and 26 which comprise in this example brakes, but may include clutches. The units 22, 24 and 26 are electrically actuated and each includes a coil 28.

The motor 12 is designed to be mounted on a base 34, FIG. 2. The base 34 supports a housing 36 for the speed changing unit comprising in this example the three brakes 22, 24 and 26. The extended shaft 17 is supported by bearings 37 attached to the housing 36. The motor 12 at the opposite side from the sequential speed changing device 16 mounts a pulley 38 on the rotor 14 for engagement with the machine (not shown) to be driven by the motor 12.

The housing 36 forms an enclosure for the brakes 22, 24 and 26. Each of the brakes has a rotatable member 22a, 24a and 26a and a stationary member 22b, 24b and 26b. The coil 28 is wound in each of the stationary members 22b, 24b and 26b.

The rotor 14 is joined to the extension shaft 17 by a bushing 40 such as the Dodge taperlock bushing. The shaft 17 has a bushing 42 mounted thereon which is identical to the bushing 40. The bushings 40 and 42 have the rotatable brake members 22a, 24a and 26a secured thereto.

The stationary brake members 24b and 26b are mounted on a stationary plate 46 having an aperture therein to allow the shaft 17 to pass. The stationary member 22b is secured to a wall of the housing 36. The housing 36 is attached to the motor 12 by a series of bolts 48 or the like.

The sequential speed changing device 16 including the three braking units 22, 24 and 26 is actuated by the sequence control box 18 to stop or start the motor 12. Thus, each brake 22, 24 or 26 is kept within the manufacturers' tolerance, limits of heat allowed for normal wear. With the motor 12 energized by the three phase supply 13a, 13b and 13c, the rotor 14 is caused to rotate. When the machine (not shown) driven by the motor 12 has to be stopped while a function is performed to a material being processed and then started again, one of the brakes 22, 24 and 26 is energized. The sequential control box 18 selects a single brake coil 28 of the brakes 22, 24 or 26 to engage the shaft 17 through the rotating members 22a, 24a or 26a. If the stationary member 22 is selected the other brakes 24 and 26 are allowed to cool through their nonoperating cycle.

Within the scope of the invention is the use of as many speed changing units, such as 22, 24 and 26, as are necessary for efficient operation for the sequential speed changing device 16, depending upon the number of times per minute the driven machine (not shown) is slowed, stopped and started.

The problem of excessive heat generated by rapid cycling of a single unit is eliminated, thus allowing speed changing units to be operated without the addition of a cooling unit. The invention further contemplates utilization of brakes and clutches as the speed changing units such that the motor 12 is not required to stop. This allows more rapid starting and stopping of the machine (not shown) than can be accomplished through the use of a brake controlled drive.

By way of example, varying combinations of speed changing units with the motor 12 are shown diagrammatically in FIGS. 4 to 6. Thus, the motor 12 has an extended shaft portion 17 with alternate brakes and clutches including a clutch 50, a brake 52, a clutch 54 and a brake 56. Each of the speed changing units 50, 52, 54 and 56 is selectively energized by the sequence control box 18 by an electric coil (not shown) associated with each of the units, FIG. 4.

As another example, the motor 12 is connected by a V-belt drive to a speed changing unit comprising three brakes 62, 64 and 66 which control the stopping and starting of a machine 68 driven by a shaft 70, FIG. 5.

Yet another example has the motor 12 driving a pair of shaft extensions 17a, 17b mounted on either side of the rotor 14, FIG. 6. The speed changing units are mounted on both of the shaft extensions 17a and 17b and comprise from the left a pair of brakes 76, 78, a clutch 80, and on the extension shafts 17b three brakes 82, 84 and 86.

The clutch unit may be any electric operated clutch such as a friction disc, dry operating, electromagnet type. The electromagnet and an iron disc comprise a pair of rotatable elements shiftable axially relative to each other. When the electromagnet is energized, the paired elements are magnetically joined to connect the rotor and an output shaft.

When the electromagnet is deenergized, the electromagnet and iron disc are separated. There is no connection between the rotor and the output shaft. The clutch cooperates with the brake units so that the clutch and only one brake unit can be energized at any one time.

Although minor modifications might be suggested by those versed in the art, it should be understood that I wish to embody within the scope of the patent warranted hereon all such embodiments as reasonably and properly come within the scope of my contribution to the art.

I claim:

1. A system for controlling the operation of a device subjected to repeated starting and stopping or change in speed and driven by a rotor, said system including a plurality of speed control unit means, the improvement comprising means connecting said unit means in said system in a manner such that each unit means can be independently operated between engaged and disengaged conditions, means for independently and selectively operating each unit means at intervals selected to prevent heat generated by said unit means when in engaged position from exceeding the manufacturer's heat tolerance, the number of unit means in said system being sufficient to enable the system to function in its intended manner without damage from overheating to said unit means, each unit means being incapable alone of effectively controlling the operation of the device without damage to the unit from overheating.

2. A system as recited in claim 1 wherein said plurality of speed control unit means comprises at least two brakes.

3. A system in accordance with claim 1 in which the speed control units are electrically energized brakes.

4. The method of controlling the operation of a system requiring intermittent stopping and starting or changes in speed, by means of a plurality of braking units each of which alone is incapable of functioning effectively by reason of damage caused by overheating, the improvement comprising selectively engaging and disengaging said units in accordance with temperature change in each member during operation of said system so that the temperature of no unit exceeds the heat tolerance of said unit.

5. The method in accordance with claim 4 in which the units are selectively engaged and disengaged in such sequence that only one unit is engaged while the other units are disengaged and cooling.

6. A speed control system for a rotary action device operable cyclically, comprising:
 a. a plurality of individually operative friction disc and electromagnet type speed control units all arranged to be actuated to control the same operating cycles of said device in the same direction of rotation in substantially the same way and to substantially the same effect, and said units being subject to overheating and eventual ineffectiveness if any one unit alone controlled said operating cycles; and
 b. means operative to individually but with equal effect actuate each individual unit to operate in the control of said cycles within a safe operating temperature range and without overheating so that the system will continue operating indefinitely at optimum effectiveness.

7. A sequential speed changing device comprising:
 a. a motor;
 b. a rotor driven by the motor;
 c. a plurality of stationary brake elements mounted adjacent said rotor;
 d. a plurality of movable brake elements operatively associated with said stationary brake elements; and
 e. sequence control means to selectively energize each stationary brake element and associated movable brake element to brake-set position, without actuating other stationary brake elements and associated movable brake elements said brake elements being out of engagement when deenergized.

8. A sequence control device for a motor as recited in claim 7 including clutch means operatively connected to said rotor.

9. A sequence control device as recited in claim 7 including an electric coil associated with each of said stationary brake elements to electrically actuate said elements, and said sequence control means supplies individual energization to an electric coil of each separate stationary brake element whereby the brakes may be operated individually to be engaged one at a time thus allowing the other brakes to cool during the period they are out of engagement.

10. A sequence control device as recited in claim 9 wherein said brakes are separated from said motor rotor by a clutch.

11. A sequential speed change device comprising:
 a. a motor;
 b. a rotatably mounted rotor driven by said motor;
 c. an output shaft to a load connected through said rotor;
 d. a plurality of paired rotatable and stationary members mounted on said rotor;
 e. at least a pair of separate rotatable members relatively and axially movable between and engaged and disengaged position and operatively connected between said paired rotatable and stationary members; and
 f. sequential control means to independently energize paired rotatable and stationary members, whereby to enable a single pair of rotatable and stationary members to be engaged and the other pair of rotatable and stationary members to remain disengaged at any one time.

12. A sequential speed changing device as recited in claim 11 wherein said stationary members and one of said pair of rotatable members have electrically energized coils to control the speed of the output shaft.